United States Patent [19]

Hautvast et al.

[11] Patent Number: 5,043,562
[45] Date of Patent: Aug. 27, 1991

[54] MULTI-DATACARD ARRANGEMENT

[75] Inventors: Heinz-Josef Hautvast, Brigachtal; Siegfried Koch; Benjamin Säger, both of Villingen-Schwenningen, all of Fed. Rep. of Germany

[73] Assignee: Mannesmann Kienzle GmbH, VS-Villingen, Fed. Rep. of Germany

[21] Appl. No.: 263,595

[22] Filed: Oct. 27, 1988

[30] Foreign Application Priority Data

Oct. 27, 1987 [DE] Fed. Rep. of Germany ....... 3736258

[51] Int. Cl.⁵ .................. G06K 7/00; G06K 13/00; G06K 19/00; G07B 15/02
[52] U.S. Cl. .................. 235/440; 235/384; 235/441; 235/475; 235/485; 235/486; 235/487
[58] Field of Search ............ 235/375, 380, 432, 440, 235/441, 448, 486, 487, 491, 492, 495, 488; 361/393, 394, 395, 397, 399; 283/94, 98, 99, 100, 904

[56] References Cited

U.S. PATENT DOCUMENTS

| 3,683,806 | 8/1972 | Rudolph | 283/98 |
| 3,859,508 | 1/1975 | Brosow et al. | 235/491 |
| 4,172,552 | 10/1979 | Case et al. | 235/432 |
| 4,449,775 | 5/1984 | de Pommery et al. | 235/441 |
| 4,602,351 | 7/1986 | Shimamura et al. | 235/441 |
| 4,700,840 | 10/1987 | Haddock | 235/487 |
| 4,780,793 | 10/1988 | Ohtsuki | 235/492 |
| 4,789,776 | 12/1988 | Inoue | 235/487 |

FOREIGN PATENT DOCUMENTS 1279352 10/1968 Fed. Rep. of Germany .
3222445 1/1983 Fed. Rep. of Germany .
3505068 6/1986 Fed. Rep. of Germany .

Primary Examiner—Stuart S. Levy
Assistant Examiner—Edward H. Sikorski
Attorney, Agent, or Firm—Toren, McGeady & Associates

[57] ABSTRACT

A datacard arrangement in an apparatus in which several datacards are used simultaneously, including a datacard receptacle designed to receive two datacards, and two datacards lying one on the other inserted into a data transmittal position in the datacard receptacle.

10 Claims, 4 Drawing Sheets

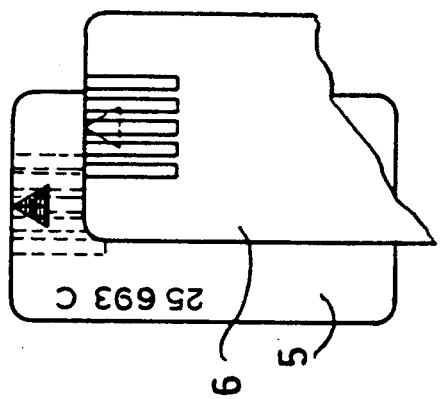
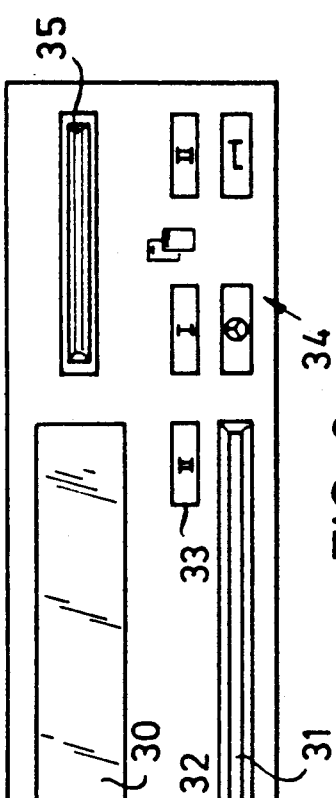
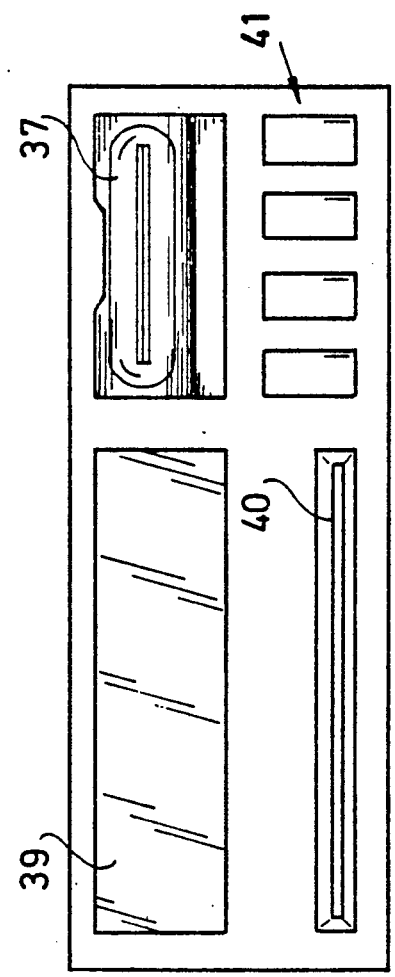
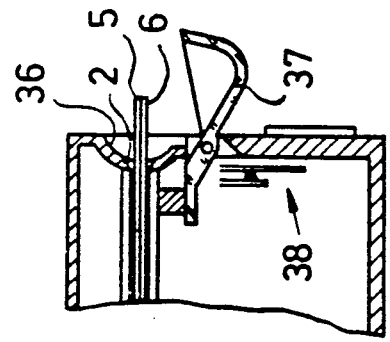

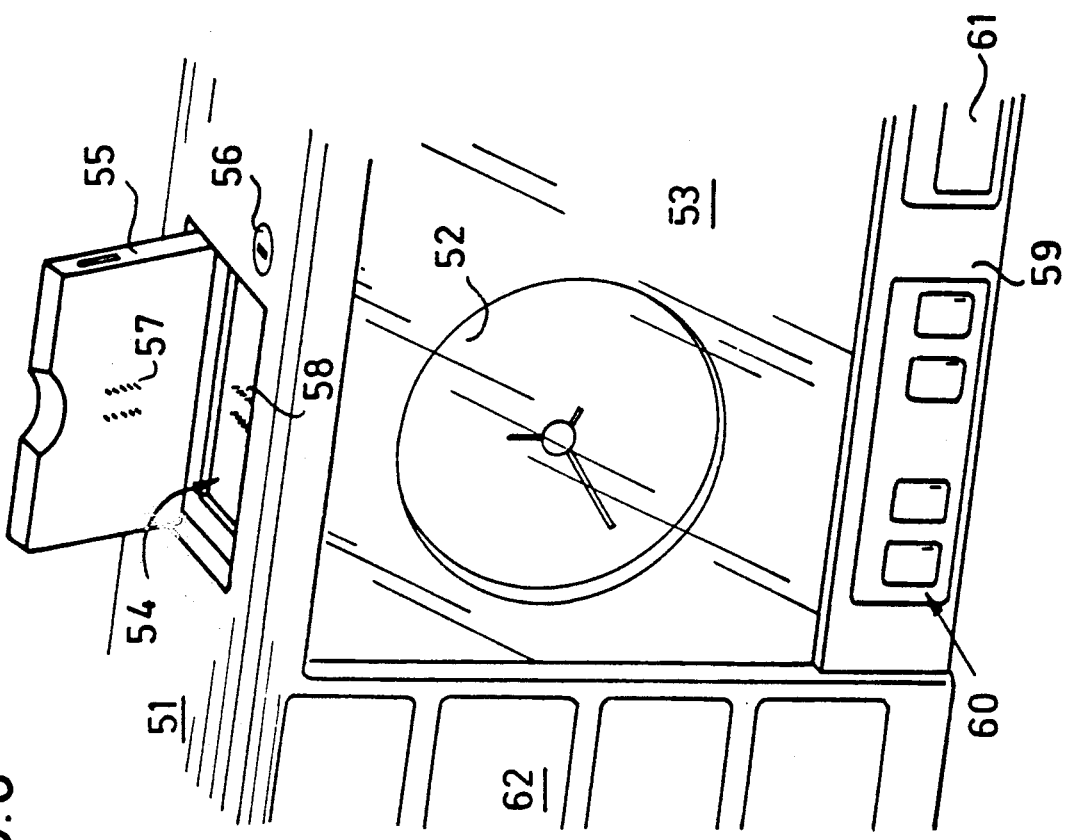
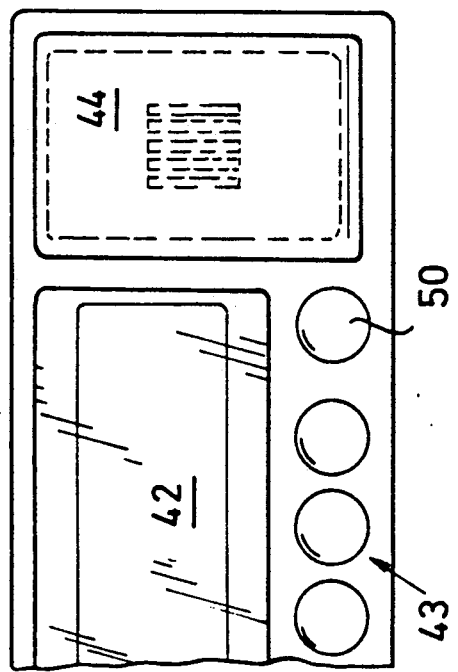
FIG. 6
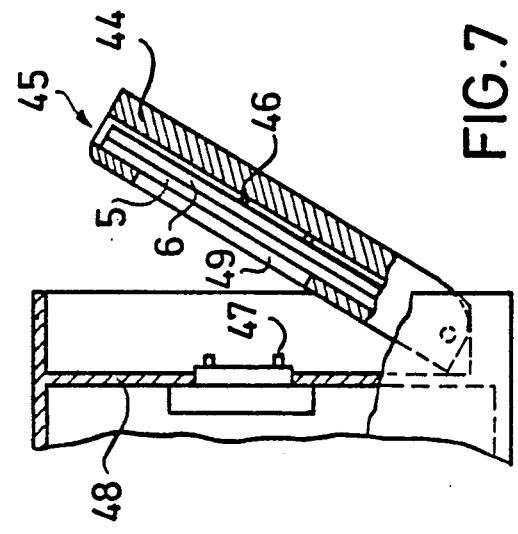
FIG. 7
FIG. 8

MULTI-DATACARD ARRANGEMENT

BACKGROUND OF THE INVENTION:

The invention is directed to a datacard arrangement in an apparatus in which several datacards are simultaneously being utilized.

Datacards, whose functions currently cover a range starting with identifying information by means of read-write memories and extending up to mini-computers, are already widely used and have gained increased acceptance as a mobile data carrier, especially in the form of a so-called chip card, which provides a high storage capacity and adequate security of the data. Thus, it is routine to make all types of purchases by means of credit cards, for instance, cards are used to purchase gasoline and for renting parking space or vehicles. Datacards are also utilized merely as identification for certain purposes, for instance when recording time worked or in banking. Datacards have also been assigned the function of keys.

With the increased significance of the datacard as an information carrier as well as with increasing functions and value content, the requirements demanded of the means, serving as a receptacle for a datacard in the data transfer position within an appliance or an apparatus, have risen. Thus, especially in the case of chip cards with a plurality of closely arranged contacts, an accurate positional definition is required. Additionally, apart from the absolutely required scanning means, locking and unlocking installations as well as access securing means possibly also a transport trolley guided in the housing of the datacard receptacle concerned are increasingly used. This means that the datacard receptacle, which for the operator as a rule appears only as a gap into which the datacard is to be inserted, becomes a relatively expensive receiving aggregate.

In utilization cases where several datacards are required at the same time for a specific function, where several persons correspond with the same appliance by means of datacards at the same time or where machine data and personnel data are to be separately acquired in a decentralized manner, the total expenditure involved apart from the space requirement becomes disproportionately high. Examples of such utilization cases are as follows:

The cooperative key function of two datacards, the cooperative utilization of one datacard with one identification card, if the input of an identification number through a keyboard is too risky because of safety considerations, the decentralized acquisition for recording of manufacturing data with a first datacard which for instance is assigned to a specific order, together with a personalized second datacard, which serves for acquisition [or recording] of the time worked, and, as is shown in the tachograph system described in DE-PS 35 05 068, the simultaneous utilization of datacards assigned to the operator and passenger of a motor vehicle, in which at least the personalized data of the motor vehicle operation are stored.

Compared to the diagram disk routinely used in tachographs, so as to keep dealing with the lastly mentioned utilization example, the datacards in their role as data carriers assigned to personnel or drivers fulfill in a very special manner the requirements in the motor vehicle transportation operation as far as driver location—and motor vehicle change are concerned; this especially because, in the case of memories implanted into chip cards, several working days can be collected without any problems and thus the legal requirement stating that trips of the two previous days must be producible on demand, can be fulfilled in a particularly simple manner.

The development of ever more compact apparatus with a strict optimization of cost and output, limited space conditions in armature panels of motor vehicles and the conditions of production lines manufacture applying to the motor vehicle sector complicate the acceptance of datacards which is in itself desirable into utilization areas not usual hitherto, especially however the simultaneous utilization of several datacards in the same appliance or apparatus. Thus one is faced with the task of reducing the space requirements and the technical resources for the required datacard receptacles for the utilization of several datacards in the same apparatus.

SUMMARY OF THE INVENTION

The solution of this task is characterized by a datacard receptacle which is designed for receiving two datacards, and in that in the data transfer position two datacards are inserted superimposed into the datacard receptacle. An embodiment variant provides that a pocket, which is removable from the apparatus, is assigned to the datacards.

The fact that apart from the data transmission means only one each locking arrangement or retaining means, access security means, ejection means, possibly transportation means for the introduction and issue and one housing of the datacard receptacles are required for two datacards is of particular advantage in the area of motor vehicle instrumentation. This small number of parts allows for a relatively small construction which is advantageous on the one hand in that the instrument installation space available in different dashboards is exceedingly small, and on the other hand functional, design and handling aspects preclude arrangement of the data collection apparatus concerned outside of the dashboard.

Furthermore it is worth mentioning that, in spite of the compact arrangement permitted by the features in this invention, the data movements can occur simultaneously without any limitation on both superimposed datacards. Herein, apart from mechanical-galvanic data transmission means, inductive or capacitive means with appropriate adaptation arrangements and if required insulation layers blocking the mutual interaction are also conceivable. In addition, the invention permits a paired utilization of two datacards coded mechanically or electronically in a complementary fashion particularly suited for locking functions as well as for admission- and access systems. Another advantage results if, in case of the tachograph use, the two working time datacards of operator and co-driver, are contained in a pocket or cartridge separable from the data card receptacle and if they are for instance retained in the pocket by a flexible lug. In case of a driver change the cartridge must only be turned with this arrangement of the datacards, meaning that the handling ease of the datacards is optimized in a special manner for this application case compared to the procedure required with the diagram disks.

Furthermore, the use of the invention in a fare computer of a taxi is appropriate, wherein because of the relatively flat construction of this apparatus a pocket-shaped pivoting drawer which can be pivoted out of the front wall is assigned to the datacard pair. In this case a datacard, which is possibly not easily removable, serves for collection of motor vehicle operational data or trip data relevant for taxi operations, while the other datacard which is located "at the top" or "inside" in the pivoting drawer and which can be relatively easily removed from a suitable retaining arrangement, for instance by a displacement, serves as a personalized data carrier for the collection of working times of the driver concerned. This datacard can be additionally assigned the function of a driving license- or as a utilization authorization. This concept is also conceivable when applied to construction machinery, manufacturing machinery or in rental vehicles, wherein the functions of the personalized datacard can include additional utilization limitations, for instance a command for speed limits.

The invention is described with particularity hereafter with the help of drawings.

BRIEF DESCRIPTION OF THE DRAWINGS

FIG. 2 a front view of a data collection apparatus, for instance of a tachograph, in which the datacard receptacle in the invention has been arranged;

FIG. 3 is a view of two datacards in a position required for insertion into the datacard receptacle designed in accordance with the invention;

FIG. 4 is a front view of an alternate embodiment of a data collection apparatus in which the slot for receiving datacards is lockable by a flap arranged at the front;

FIG. 5 is a partial side view of the data collection apparatus in FIG. 4 in section;

FIG. 6 is a front view of a data collection- or information apparatus in which the datacard receptacle is designed as a pivoting drawer operable from the front side;

FIG. 7 is partial side view of the data collection apparatus in FIG. 6 in section;

FIG. 8 is a view of an instrument console with the datacard receptacle, into which the datacards are inserted and retained by means of a cover;

DETAILED DESCRIPTION OF THE PREFERRED EMBODIMENTS

Figure 1:
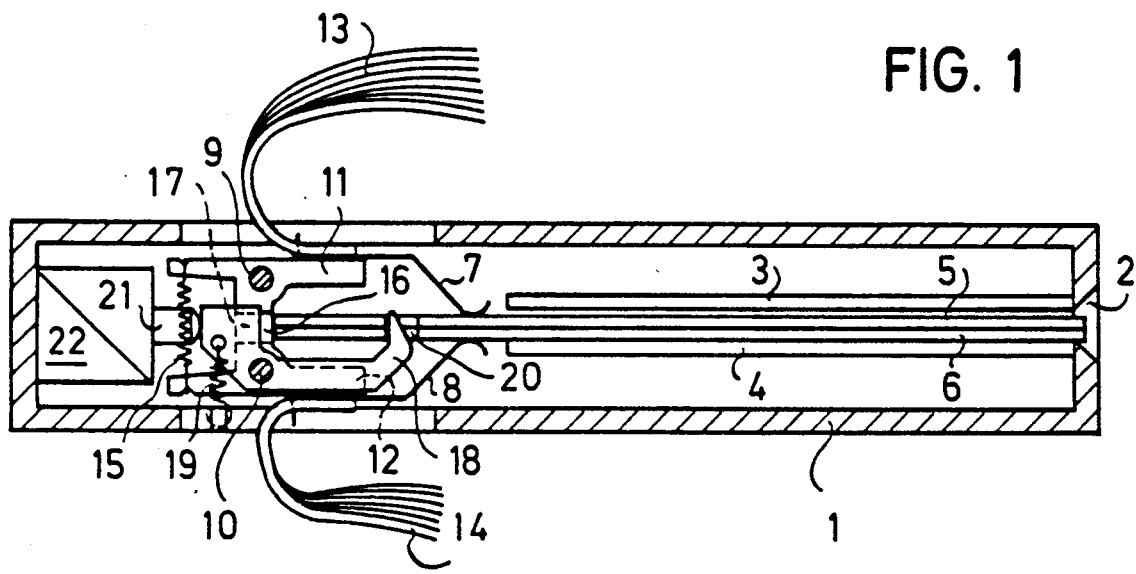
FIG. 1 shows an embodiment of a datacard receptacle designed for receiving two datacards, in section, pursuant to the present invention.

The datacard receptacle in FIG. 1 is formed by a preferably two-part housing 1 suitable for installation. The housing 1 has a slot 2 and guide rails 3,4 designed so that two datacards 5 and 6 back-to-back or front-to-front can be in any case simultaneously slid-in in such a way that the interface contacts of the two datacards 5 and 6 point outwards and that they are accessible from the outside as well as that the visually readable information sides are oriented to face each other. Contact springs 7, 8 as probing devices are assigned to the interface contacts, and are fastened to carriers 11 and 12 pivotably supported respectively around an axis 9 or 10 and are in electrical contact with respectively one flat cable strand 13 and 14.

Legs 16 and 17 molded to the carriers 11 and 12 rest in the position depicted in FIG. 1 respectively at the same front face of the two datacards 5 and 6, this under the effect of a tension spring 15 acting upon the carriers 11 and 12. At the same time, a latch 18 also supported on the axis 10 and which is acted upon by a tension spring 19 engages into suitable apertures 20 in the datacards 5 and 6. If the latch 18 is actuated by an armature 21 of an electromagnet 22 and lifted out of the apertures 20, then the tension spring 15 acts to pivot the two carriers 11 and 12 and causes an ejection of the two datacards 5 and 6 by means of their legs 16 and 17.

Figure 9:
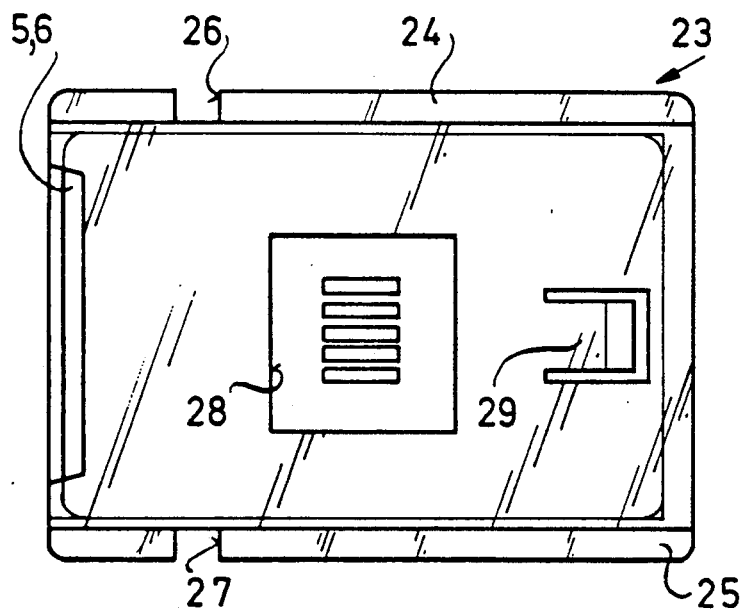
FIG. 9 shows a pocket assigned to hold datacards for use in a datacard receptacle.

The two datacards 5 and 6 can also be inserted by means of a cassette or pocket into the datacard receptacle in FIG. 1. Such a cassette or cartridge 23 is shown on FIG. 9. Guide web 24 and 25 can be configured at opposite end sides of the cassette housing, in which webs apertures 26 and 27 are provided for one or several latches 18. Furthermore, a window 28 for the passage of the contact springs 7 or 8 is provided on each side of the cassette 23. A tongue 29 constructed in the cassette wall serves for the flexural retention of the datacards 5 and 6 within the cassette 23.

A bistable snap-in gear arrangement known in itself which is actuatable by the datacards 5 and 6 or the cassette 23 can be provided instead of the locking and unlocking arrangement depicted in FIG. 1.

FIG. 2 shows the front side of a data collection apparatus suitable for installation in the dashboard of a motor vehicle, for instance of a tachograph. The apparatus includes a display arrangement 30 designed as a line display, a draw-in pit 31 through which a leaf-shaped printout carrier is insertable for the removal of a trip protocol, pushbuttons 32 and 33 assigned to the driver and co-driver for the input of "ready times" and "break times" (the driving times are recognized automatically), a pushbutton field 34 for the selection of information about the working- and break time situation as well as a datacard receptacle 35, into which the datacards 5 and 6 belonging to driver and co-driver or driver I and driver II are inserted as shown in FIG. 3.

FIGS. 4 and 5 show an embodiment variation of such a tachograph. The slit 2 of the datacard receptacle provided with a recessed grip 36 is assigned a flap 37 in this embodiment, which coacts with a switch 38 and is lockable electromagnetically. The flap 37 can be designed in such a way in the datacard receptacle with adaptation of frictional means, so as to cause a positioning of the datacards 5 and 6. An ejection function is not absolutely required in this solution, since the datacards can be easily removed manually after the flap 37 has been opened. In addition, the apparatus also comprises on its front side a display arrangement 39, a draw-in pit 40 and a keyboard 41.

FIGS. 6 and 7 show an embodiment for especially flat appliances or apparatus, wherein the two datacards 5 and 6 are arranged in planes parallel to the front surface of the data collection—or information apparatus concerned, for instance of a taxi fare computer. For this purpose a pivoting drawer 44 pivotable perpendicularly to the front face of the apparatus including a display 42 and an operational keyboard 43, has been provided, in which a receiving pit 45 assigned to the datacards 5 and 6 has been configured. Flexural contact pins serve to contact the datacards 5 and 6. Pins 46 which are assigned to the datacard 6 are arranged in the pivoting drawer 44, and pins 47 assigned to the datacard 5 are located in the housing 48 of the apparatus and which penetrates through a recess 49 so as to contact the datacard 5. The recess serves in addition for pushing the datacards 5 and 6 out of the receiving pit 45. A pushbutton 50 is provided for unlocking of the pivoting drawer 44.

FIG. 8 shows an instrument console 51 of a motor vehicle with the usual indicator instruments being visible behind a common glass pane 53. A pivotably supported cover 55, which can be lockable by means of a suitable lock 56, has been assigned to the instrument console 51. Recess 54 is designed as a datacard receptacle wherein two datacards are insertable and simultaneously contactable, meaning sets of contacts 57 and 58 have been provided in the cover 55 as well as in the base of the recess 54. Pusbuttons 60 are installed in a suitable cutout in a glare shield 59, by means of which the respective type of work can be entered by the driver in the known fashion. A data cassette 61 serves for the chronologically correct trip data collection in the depicted modulized tachograph and affords the possibility to assign also vehicle dependent data easily to a specific driver. 62 designates empty spaces, switches or signal elements in the instrument console.

Figure 10:
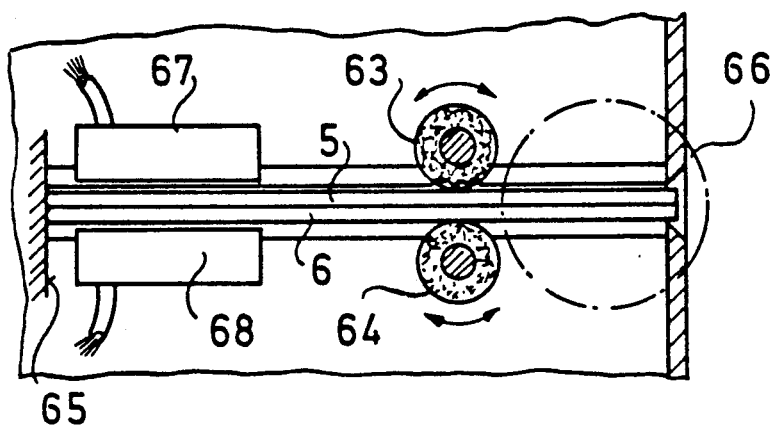
FIG. 10 is an essentially diagrammatic illustration of a datacard receptacle with transportation means assigned to the datacards.

FIG. 10 depicts schematically that transport rollers or transport rolls 63 and 64 can be assigned to the datacards 5 and 6, which in the simplest case exert a clamping effect, which however can also be driven or powered. In the last mentioned case the datacards 5 and 6 can be drawn into the datacard receptacles so as to remain inaccessible, also an always defined data transmittal position at for instance a stop 65 can be achieved. The issue of the datacards 5 and 6 can for instance also occur manually by means of a hand wheel 66 or respectively by a hand wheel operationally connected with the transport rollers 63 and 64. Furthermore, this solution affords the possibility to issue the datacards 5 and 6 individually. The data transmittal and scanning occurs in a contactless manner in this embodiment, meaning that the depicted write-read units 67, 68 operate inductively, capacitively or optically depending on the design of the datacard.

Figure 11:
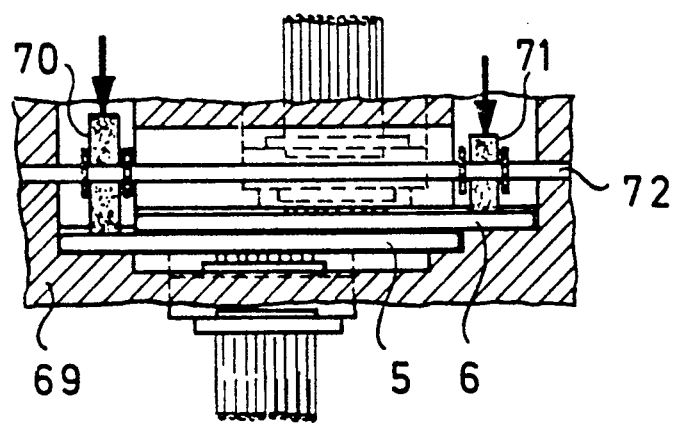
FIG. 11 shows, in section, an embodiment of a datacard receptacle with datacards arranged in a staggered manner.

FIG. 11 shows an embodiment of a datacard receptacle, in the housing 69 of which a guide assigned to the datacards 5 and 6 has been provided which permits the arrangement of the datacards 5 and 6 in an offset manner. With this arrangement the transport rollers 70 and 71 acting upon the datacards can be arranged on a common axis 72, which reduces the construction height and simplifies the resources required for the design.

Figure 12:
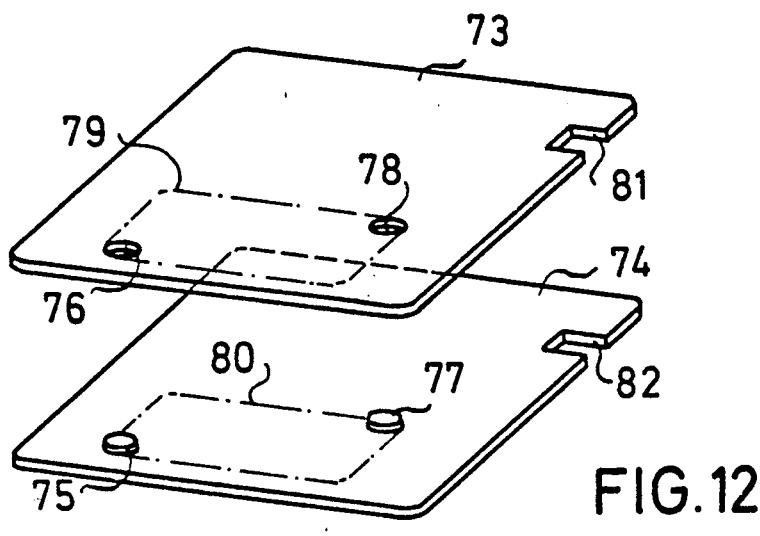
FIG. 12 illustrates in perspective two mechanically coded datacards.

FIG. 12 shows two datacards 73 and 74 which are coded mechanically, and actually by means of pin-hole-interconnections 75, 76 and 77, 78 which are attached for instance within the field 79 or 80 selected upon the datacards or are attached in any other manner. With such a special card or for instance a pair of cards fulfilling a key function, a possible locking slot 81 or 82 can also be placed asymmetrically.

For completeness sake it should be mentioned that, in order to prevent the datacards from resting directly one upon the other, suitable guide rails or an intermediate wall can be constructed in the datacard receptacle without having to abandon the advantage in the invention. It should further be mentioned that the datacard receptacle can be provided at any point in the dashboard and should be provided at a location where the best possible handling of the datacards exists.

While the invention has been illustrated and described as embodied in a datacard arrangement, it is not intended to be limited to the details shown, since various modifications and structural changes may be made without departing in any way from the spirit of the present invention.

What is claimed as new and desired to be protected by Letters Patent is set forth in the appended claims:

1. A receptacle for datacards for an apparatus in which two separate and independent datacards are used simultaneously, comprising:
    a housing having an insertion slot with a height corresponding to more than twice a thickness of a single datacard, and a datacard spaced into which said two datacards are receivable;
    means for guiding two superimposed datacards, said guiding means being arranged in said housing downstream of the insertion slot;
    two scanning devices arranged in said housing so as to face the datacard space from two sides; and
    a driving device to which each of said datacards is operationally connectible so that said datacards are insertable and issuable independently of one another.

2. A receptacle according to claim 1, wherein said guide means said datacards in said housing so as to be offset from each other in a card plane, said driving device being arranged to one side of the datacard space.

3. A receptacle for independent datacards for an apparatus in which two separate and independent datacards are used, comprising:
    a housing having an insertion slot with a height corresponding to more than twice a thickness of a single datacard, and a datacard space into which said two independent datacards are receivable;
    means for guiding said two datacards in a superimposed manner, said guiding means being arranged in said housing downstream of the insertion slot; and
    two scanning devices arranged in said housing so as to face the datacard space from two sides and utilize said two superimposed data cards independently.

4. A receptacle according to claim 3, wherein said two datacards to be used with each other are mechanically formed so as to complement each other.

5. A receptacle according to claim 3; and further comprising a pocket provided so as to be removable from the apparatus, and so as to hold said datacards.

6. A receptacle according to claim 3; and further comprising a driving device, each of said datacards being operationally connectable with said driving device so that said datacards are insertable and issuable independently of each other.

7. A receptacle according to claim 6, wherein said guide means guides said datacards in said housing so as to be offset from each other in a card plane, said driving device being arranged to one side of the datacard space.

8. A receptacle according to claim 3, and further comprising locking means arranged in said housing so as to coact with locking apertures configured in said datacards.

9. A receptacle according to claim 3, and further comprising a lockable flap arranged so as to selectively cover and expose the slot.

10. A receptacle according to claim 3, wherein said housing includes a folding drawer pivotable around an axis.

* * * * *